United States Patent
Rohrssen et al.

(10) Patent No.: US 9,068,750 B2
(45) Date of Patent: Jun. 30, 2015

(54) COMBUSTOR WITH A PRE-NOZZLE MIXING CAP ASSEMBLY

(75) Inventors: Robert Joseph Rohrssen, Greenvville, SC (US); Patrick Benedict Melton, Greenville, SC (US)

(73) Assignee: General Electric Company, Schenectady, NY (US)

( * ) Notice: Subject to any disclaimer, the term of this patent is extended or adjusted under 35 U.S.C. 154(b) by 656 days.

(21) Appl. No.: 13/040,289

(22) Filed: Mar. 4, 2011

(65) Prior Publication Data

US 2013/0081400 A1 Apr. 4, 2013

(51) Int. Cl.
*F02C 1/00* (2006.01)
*F02G 3/00* (2006.01)
*B05B 5/00* (2006.01)
*F23R 3/28* (2006.01)
*F02C 7/22* (2006.01)

(52) U.S. Cl.
CPC .. *F23R 3/286* (2013.01); *F02C 7/22* (2013.01)

(58) Field of Classification Search
USPC ........ 60/737, 738, 739, 740, 742, 746, 39.37; 239/132.3, 398
See application file for complete search history.

(56) References Cited

U.S. PATENT DOCUMENTS

| 4,100,733 | A | * | 7/1978 | Striebel et al. | ............. 60/39.463 |
| 5,491,970 | A | | 2/1996 | Davis, Jr. et al. | |
| 6,363,724 | B1 | * | 4/2002 | Bechtel et al. | .................. 60/737 |
| 2004/0035114 | A1 | * | 2/2004 | Hayashi et al. | ................. 60/737 |
| 2008/0110173 | A1 | * | 5/2008 | Bunker | ............................ 60/737 |
| 2010/0008179 | A1 | * | 1/2010 | Lacy et al. | ..................... 366/134 |
| 2010/0031662 | A1 | * | 2/2010 | Zuo | ................................. 60/740 |
| 2010/0095676 | A1 | | 4/2010 | Uhm et al. | |
| 2010/0192581 | A1 | | 8/2010 | Ziminsky et al. | |
| 2010/0218501 | A1 | | 9/2010 | York et al. | |

FOREIGN PATENT DOCUMENTS

| CN | 101201176 A | 6/2008 |
| CN | 101943421 A | 1/2011 |
| EP | 2216599 A2 | 11/2009 |

OTHER PUBLICATIONS

U.S. Appl. No. 12/901,648, filed Oct. 11, 2010, Hughes, et al.
U.S. Appl. No. 12/983,342, filed Jan. 3, 2011, Toronto, et al.
Chinese Patent Office Action for Application No. CN 201210063809.X dated Dec. 3, 2014.

* cited by examiner

*Primary Examiner* — Phutthiwat Wongwian
*Assistant Examiner* — William Breazeal
(74) *Attorney, Agent, or Firm* — Sutherland Asbill & Brennan LLP

(57) ABSTRACT

The present application and the resulting patent provide a pre-nozzle mixing cap assembly positioned about a cap member of a combustor for mixing a flow of air and a flow of fuel. The pre-nozzle mixing cap assembly may include a fuel plenum in communication with the flow of fuel and a number of tubes in communication with the flow of air and extending through the fuel plenum. Each of the tubes may include a number of fuel holes therein such that the flow of fuel in the fuel plenum passes through the fuel holes and mixes with the flow of air.

20 Claims, 4 Drawing Sheets

US 9,068,750 B2

COMBUSTOR WITH A PRE-NOZZLE MIXING CAP ASSEMBLY

TECHNICAL FIELD

The present application relates generally to gas turbine engine combustors and more particularly relates to a combustor with a pre-nozzle mixing cap assembly for mixing fuel and air upstream of the fuel nozzles and having a cooling flow of air extending therethrough.

BACKGROUND OF THE INVENTION

In a gas turbine engine, operational efficiency generally increases as the temperature of the combustion stream increases. Higher combustion stream temperatures, however, may produce higher levels of nitrogen oxides ("$NO_x$") and other types of emissions. Such emissions may be subject to both federal and state regulation in the United States and also subject to similar regulations abroad. A balancing act thus exists between operating the gas turbine engine in an efficient temperature range while also ensuring that the output of $NO_x$ and other types of regulated emissions remain below the mandated levels.

Several types of known gas turbine engine designs, such as those using Dry Low $NO_x$ ("DLN") combustors, generally premix the fuel flows and the air flows upstream of a reaction or a combustion zone so as to reduce $NO_x$ emissions via a number of premixing fuel nozzles. Such premixing tends to reduce overall combustion temperatures and, hence, $NO_x$ emissions and the like.

Premixing, however, also may present several operational issues such as flame holding, flashback, auto-ignition, and the like. These issues may be a particular concern with the use of highly reactive fuels. For example, a flame may be present in the head-end of a combustor upstream of the fuel nozzles with any significant fraction of hydrogen or other types of fuels. Any type of fuel rich pocket thus may sustain a flame and cause damage to the combustor.

Other premixing issues may be due to irregularities in the fuel flows and the air flows. For example, there are several flow obstructions that may disrupt the flow through an incoming pathway between a flow sleeve and a liner. With a combustor having fuel injector vanes that inject fuel into the airflow upstream of the head-end, these flow disturbances may create flow recirculation zones on the trailing edge of the vanes. These recirculation zones may lead to stable pockets of ignitable fuel-air mixtures that can in turn lead to flame holding or other types of combustion events given an ignition source.

There is thus a desire for an improved gas turbine combustor design. Preferably such a combustor design may provide fuel injection that may be less prone to flame holding. Likewise, such a combustor design also may provide faster mixing so as to limit the risk of flame holding. Such a combustor design preferably can accommodate different types of fuels.

SUMMARY OF THE INVENTION

The present application and the resultant patent thus provide a pre-nozzle mixing cap assembly positioned about a cap member of a combustor for mixing a flow of air and a flow of fuel. The pre-nozzle mixing cap assembly ma include a fuel plenum in communication with the flow of fuel and a number of tubes in communication with the flow of air and extending through the fuel plenum. Each of the tubes may include a number of fuel holes therein such that the flow of fuel in the fuel plenum passes through the fuel holes and mixes with the flow of air.

The present application and the resultant patent further provide a method of mixing a flow of air and a flow of fuel about a cap member with a number of fuel nozzles of a combustor. The method may include the steps of providing a flow of air to a number of tubes positioned about the cap member, providing a flow of fuel to a fuel plenum surrounding the tubes, passing the flow of fuel through a number of fuel holes in each of the tubes, and mixing the flow of air and the flow of fuel in and/or downstream of the tubes.

The present application and the resultant patent further provide a pre-nozzle mixing cap assembly positioned about a cap member of a combustor for mixing a flow of air and a flow of fuel. The pre-nozzle mixing cap assembly may include a fuel plenum in communication with the flow of fuel, a number of tubes in communication with the flow of air and extending through the fuel plenum, and an air plenum positioned adjacent to the fuel plenum with the tubes extending therethrough. Each of the tubes may include a number of fuel holes therein such that the flow of fuel in the fuel plenum passes through the fuel holes and mixes with the flow of air.

These and other features and improvements of the present application will become apparent to one of ordinary skill in the art upon review of the following detailed description when taken in conjunction with the several drawings and the appended claims.

DETAILED DESCRIPTION

Figure 1:
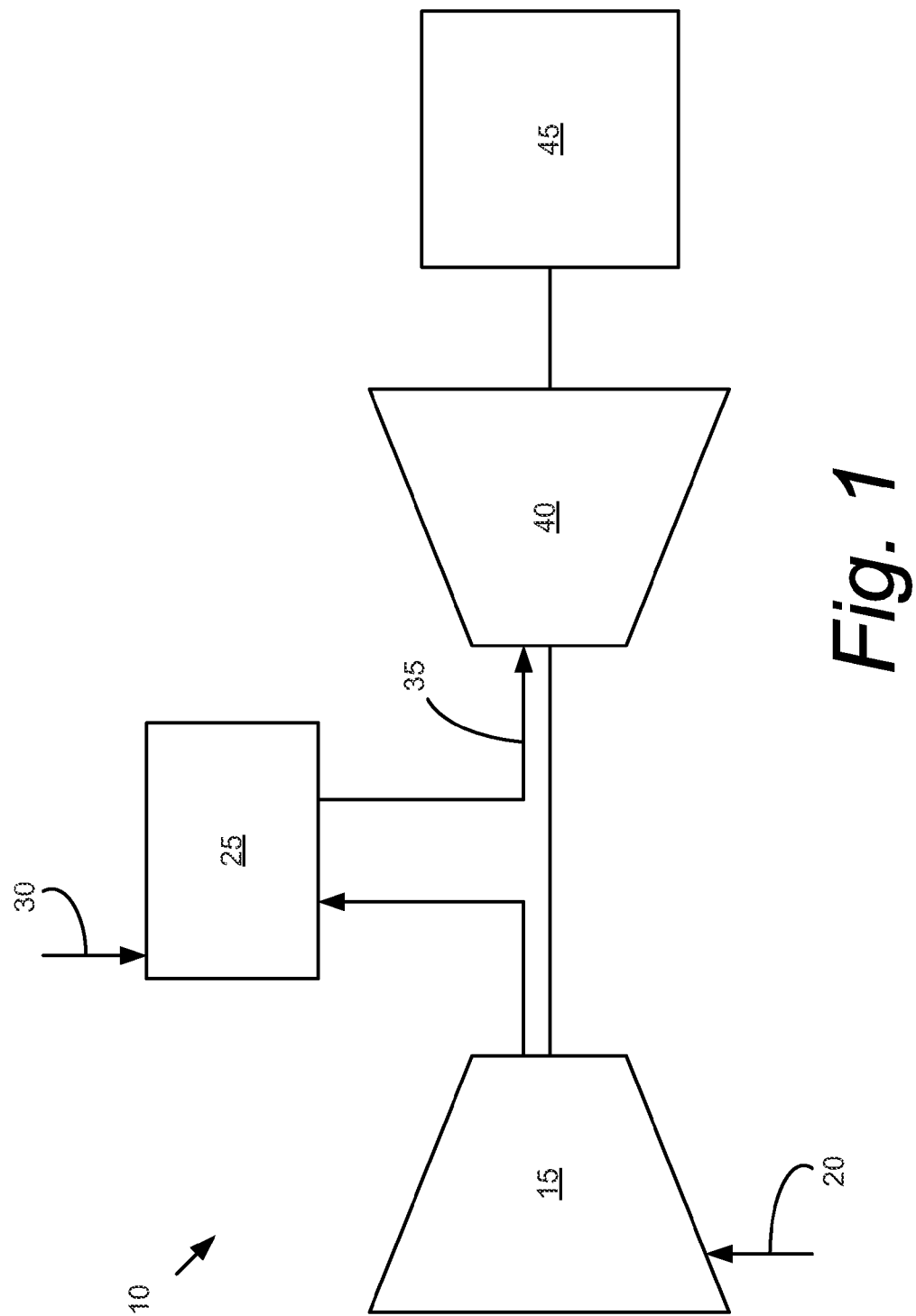
FIG. 1 is a schematic view of a known gas turbine engine as may be used herein.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor delivers the compressed flow of air 20 to a combustor 25. The combustor 25 mixes the compressed flow of air 20 with a compressed flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 and an external load 45 such as an electrical generator and the like.

The gas turbine engine 10 may use natural gas, various types of syngas, and/or other types of fuels. The gas turbine engine 10 may be anyone of a number of different gas turbine engines offered by General Electric Company of Schenectady, N.Y., including those such as a heavy duty 9FA gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
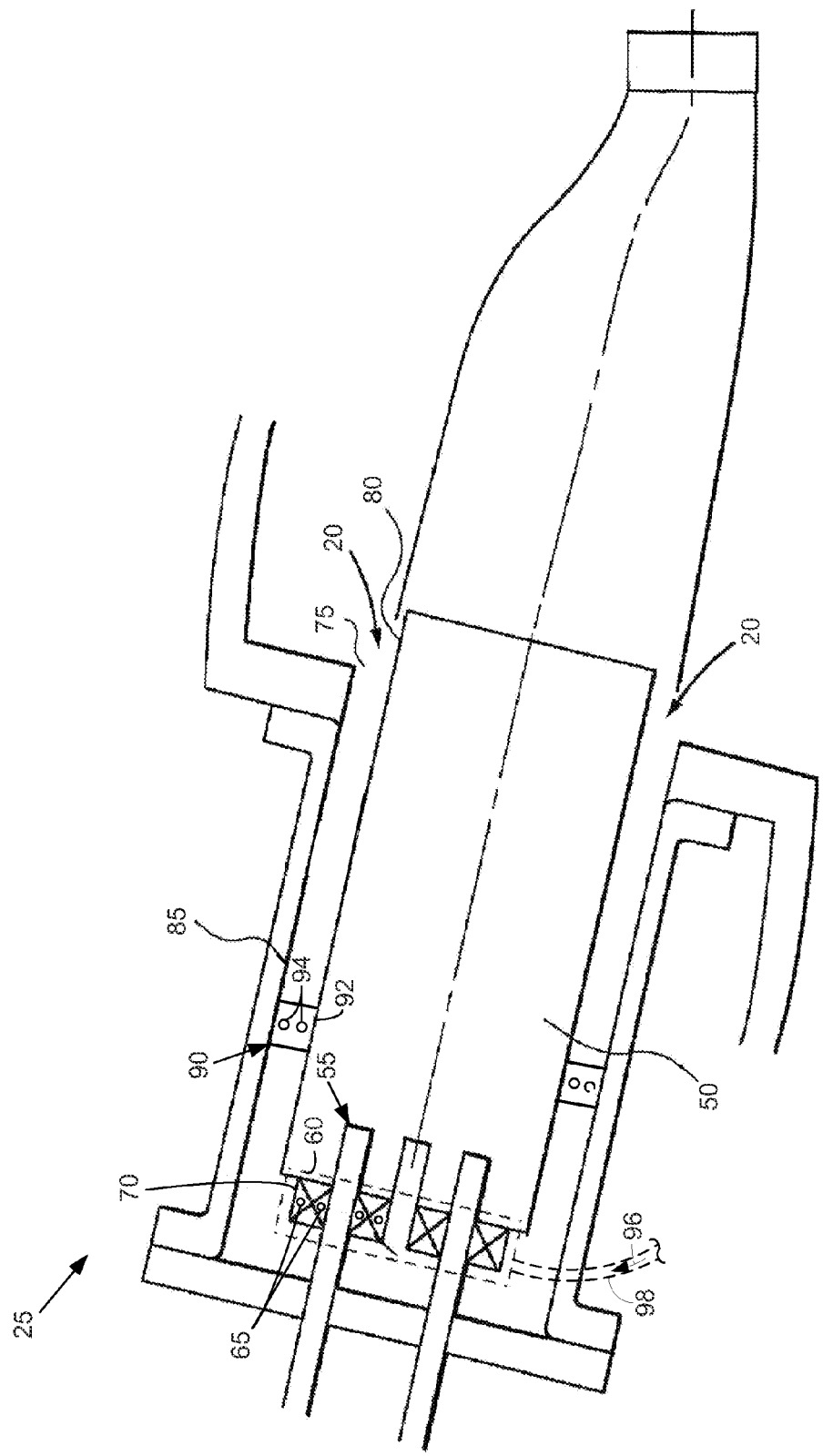
FIG. 2 is a side cross-sectional view of a known combustor of the gas turbine engine.

FIG. 2 shows a simplified example of a known combustor 25 that may be used with the gas turbine engine 10. Generally described, the combustor 25 may include a combustion chamber 50 with a number of fuel nozzles 55 positioned therein. The fuel nozzles 55 may be positioned and supported within a cap member 60 and the like. The fuel nozzles 55 also may include a number of fuel injectors 65. The fuel injectors 65 may be positioned about one or more swirlers 70. The swirlers 70 aid in the premixing of the flow of air 20 and the flows of fuel 30 therein. The fuel injectors 65 may be used with a premix fuel and the like. Other types of fuels and other types of fuel circuits may be used herein.

The flow of air 20 may enter the combustor 25 from the compressor 15 via an incoming air path 75. The incoming air path 75 may be defined between a liner 80 of the combustion chamber 50 and an outer flow sleeve 85. The flow of air 20 may travel along the incoming air path 75 and then reverse direction about the fuel nozzles 55. The flow of air 20 and the flow of fuel 30 may be ignited downstream of the fuel nozzles 55 within the combustion chamber 50 such that the flow of the combustion gases 35 may be directed towards the turbine 40. Other configurations and other components may be used herein.

The combustor 25 also may have a lean pre-nozzle fuel injection system 90 positioned about the incoming air path 75 between the liner 80 and the flow sleeve 85. The lean pre-nozzle fuel injection system 90 may have a number of fuel pegs or fuel injectors 92. The fuel injectors 92 may have an aerodynamic airfoil or streamline shape. Other shapes may be used herein. The fuel injectors 92 each may have a number of injector holes 94 therein. The number and positioning of the fuel injectors 92 and the injection holes 94 may be optimized for premixing. A premix fuel or other types of fuel flows 30 may be used therein.

The cap member 60 also may be in direct communication with a compressor discharge pressure airflow 96 via a compressor discharge pressure air path 98 and the like. The compressor discharge pressure airflow 96 may be at somewhat higher pressure than the flow of air 20 from the compressor 15 that travels along the entire incoming air path 75. The compressor discharge pressure airflow 96 may be used to cool the cap member 60 and possibly other components. The compressor discharge pressure air path 98 may be a direct path from the compressor 15, a diffuser, or otherwise. Moreover, the compressor discharge pressure air path 98 may surround the flow sleeve 85 or otherwise be positioned. Other components and other configurations may be used herein.

Figure 3:
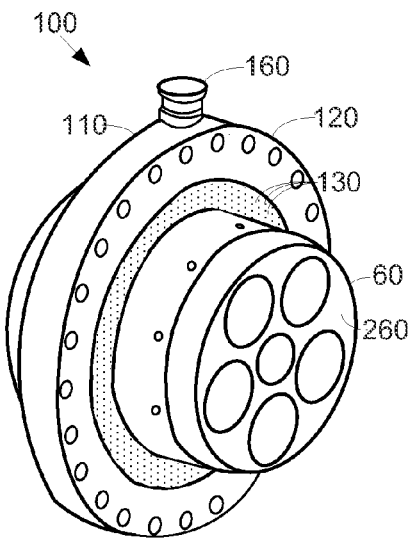
FIG. 3 is a perspective view of a pre-nozzle mixing cap assembly as may be described herein.
Figure 4:
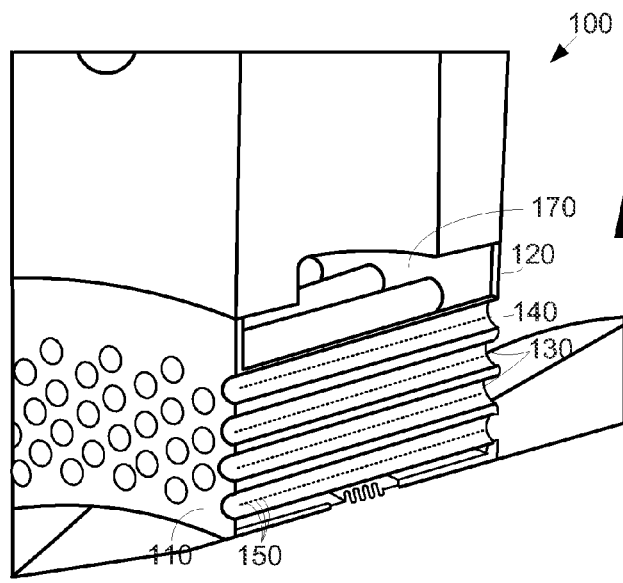
FIG. 4 is a partial side cross-sectional view of the pre-nozzle mixing cap assembly of FIG. 3.

FIGS. 3 and 4 show one example of a pre-nozzle mixing cap assembly 100 as may be described herein. The pre-nozzle mixing cap assembly 100 may be positioned about the cap body 60 and in the incoming air path 75 defined between the liner 80 and the flow sleeve 85 to receive the flow of air 20. Likewise, the pre-nozzle mixing cap 100 may be in communication with the flow of fuel 30 so as to mix the flows of fuel and air upstream of the fuel nozzles 55. The pre-nozzle mixing cap assembly 100 thus may be used in place of the fuel injectors 92 described above in the pre-nozzle fuel injection system 90 and the like.

The pre-nozzle mixing cap assembly 100 may include at least a pair of plates, a first plate 110 and a second plate 120 positioned on and surrounding the cap member 60. The plates 110, 120 may have any shape, size, or configuration. A number of tubes 130 may extend from the first plate 110 to the second plate 120. The tubes 130 may have any shape, size, or configuration. Any number of the tubes 130 may be used herein. Each tube 1130 may have a chamfered edge or radius 1140 about the entrance at the second plate 110. Each tube 130 may have a number of small fuel holes 150 positioned therein. The fuel holes 150 may have any shape, size, or configuration. Any number of the fuel holes 150 may be used herein. The length, count, and diameter of the tubes 130 and the fuel holes 150 as well as the axial locations thereof may be varied to change the overall mixing and flame holding characteristics as well as the pressure drop therethrough.

Figure 5:
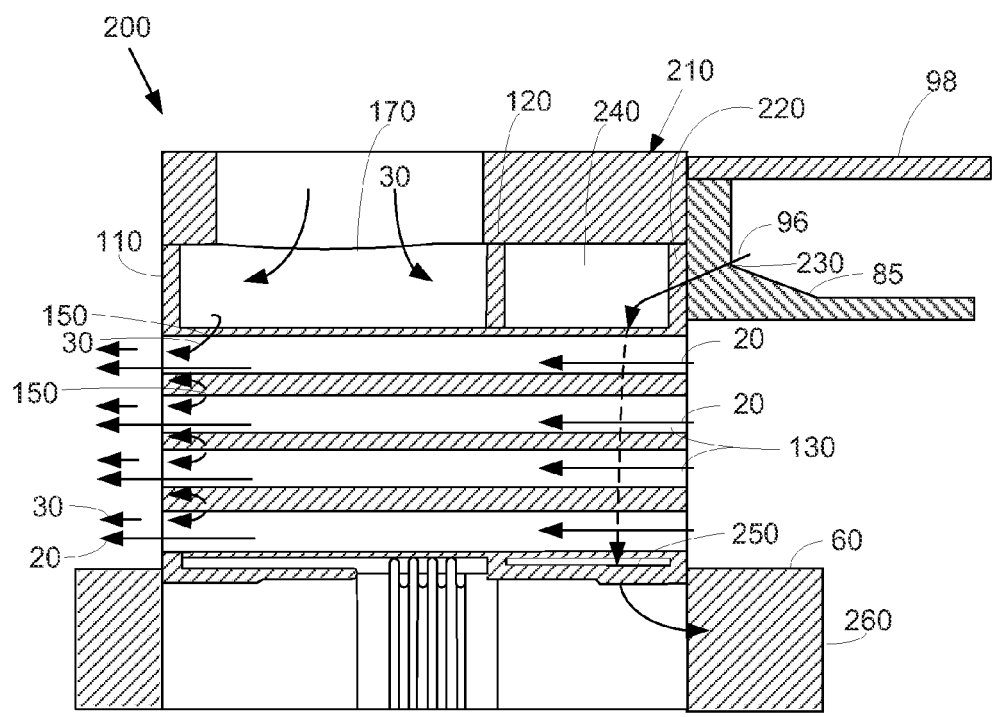
FIG. 5 is a side cross-sectional view of an alternative embodiment of a pre-nozzle mixing cap assembly as may be described herein with the addition of a cooling circuit therein.

The pre-nozzle mixing cap assembly 100 may have a fuel inlet 160 in communication with the flow of fuel 30. The fuel inlet 160 may lead to a fuel plenum 170 positioned between the plates 110, 120. The flow of fuel 30 may flow through the filet inlet 160 and into the fuel plenum 170. The flow of fuel 30 then may pass through the fuel holes 150 within each tube 130 so as to mix with the flow of air 20 passing therethrough before flowing downstream to the fuel nozzles 55 within the cap member 60. The flow of air 20 and the flow of fuel 30 may mix in and/or downstream of the tubes 130. Other components and other configurations may be used herein, FIG. 5 shows a further embodiment of a pre-nozzle mixing cap assembly 200. The mixing cap 200 may have the components of the mixing cap assembly 100 with the addition of a cooling circuit 210. The cooling circuit 210 may be defined by an additional plate, a third plate 220, positioned on the upstream end thereof. The tubes 130 thus extend through all of the plates 110, 120, and 220.

In this example, the compressor discharge pressure air path 98 may be positioned about the flow sleeve 85. The compressor discharge pressure airflow 96 thus may enter the cooling circuit 210 via a number of flow sleeve holes 230 positioned within the flow sleeve 85. Any number of the flow sleeve holes 230 may be used in any shape, size, or configuration. The cooling circuit 210 further may include an air plenum 240 with the tubes 130 extending therethrough. The cooling circuit 210 may end with a number of cap body holes 250 positioned about and in communication with the cap member 60. Any number of the cap body holes 250 may be used in any shape, size, or configuration.

The compressor discharge pressure airflow 96 thus may pass from the compressor discharge pressure air path 98, through the flow sleeve holes 230, into the air plenum 240, and into the cap body 60 via the cap body holes 250. The compressor discharge pressure airflow 96 thus may be used to provide cooling for the cap body 60, particularly along a cap face 260 thereof. Other components and other configurations may be used herein.

The pre-nozzle mixing cap assemblies 100, 200 thus provide good fuel-air mixing upstream of the fuel nozzles 55. Specifically, increased mixing and faster mixing may be provided herein. With increased mixing, the cap face 260 may be moved downstream to reduce combustor volume and residence time. Shorter residence time should be desirable to meet emission targets. Likewise, faster mixing may result in a lower flame holding risk. Specifically, the overall injecting scheme may be less prone to flame holding. The higher flame holding margin also should provide the ability to burn higher reactivity fuels such as hydrogen and higher hydrocarbons.

The use of the compressor discharge pressure airflow 96 provides improved cap face cooling and durability. Cap durability is improved by increasing the resistance to hot gases being forced upstream during periods of combustion dynamics, i.e., higher cap pressure may minimize the impact of combustion dynamics and can be used for impingement cooling. Moreover, the amount of air required for cooling should be reduced.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. A pre-nozzle mixing cap assembly positioned about a cap member
    of a combustor for mixing a flow of air and a flow of fuel upstream of one or more fuel nozzles, comprising:
        a fuel plenum in communication with the flow of fuel;
        a plurality of tubes in communication with the flow of air and extending through the fuel plenum, wherein the fuel plenum is positioned about a downstream end of the plurality of tubes;
        each of the plurality of tubes comprising a plurality of fuel holes therein such that the flow of fuel in the fuel plenum passes through the plurality of fuel holes and mixes with the flow of air upstream of the one or more fuel nozzles; and
        an air plenum with the plurality of tubes extending therethrough, wherein the air plenum is positioned at an upstream end of the plurality of tubes, wherein the air plenum is positioned forward of the fuel plenum.

2. The pre-nozzle mixing cap assembly of claim 1, further comprising a plurality of plates with the plurality of tubes extending therethrough.

3. The pre-nozzle mixing cap assembly of claim 2, wherein the plurality of plates comprises a first plate and a second plate and wherein the first plate and the second plate define the fuel plenum therebetween.

4. The pre-nozzle mixing cap assembly of claim 3, wherein the plurality of plates comprises a third plate and wherein the second plate and the third plate define the air plenum therebetween.

5. The pre-nozzle mixing cap assembly of claim 1, wherein each of the plurality of tubes comprises a chamfered edge.

6. The pre-nozzle mixing cap assembly of claim 1, further comprising a fuel inlet in communication with the flow of fuel and the fuel plenum.

7. The pre-nozzle mixing cap assembly of claim 1, further comprising a cooling circuit therein.

8. The pre-nozzle mixing cap assembly of claim 7, wherein the cooling circuit comprises a plurality of flow sleeve holes.

9. The pre-nozzle mixing cap assembly of claim 8, wherein the cooling circuit is in communication with a compressor discharge pressure airflow via the plurality of flow sleeve holes.

10. The pre-nozzle mixing cap assembly of claim 7, wherein the cooling circuit comprises the air plenum with the plurality of tubes extending therethrough.

11. The pre-nozzle mixing cap assembly of claim 7, wherein the cooling circuit comprises a plurality of cap body holes in communication with a cap body so as to cool a cap face thereof.

12. The pre-nozzle mixing cap assembly of claim 4, wherein the third plate forms a seal about the plurality of tubes.

13. A method of mixing a flow of air and a flow of fuel about a cap member with a number of fuel nozzles of a combustor, comprising:
    providing the flow of air to a plurality of tubes positioned about the cap member;
    providing the flow of fuel to a fuel plenum surrounding a downstream end of the plurality of tubes;
    passing the flow of fuel through a plurality of fuel holes in each of the plurality of tubes;
    mixing the flow of air and the flow of fuel in and/or downstream of the plurality of tubes
I and upstream of the fuel nozzles;
    providing a compressor discharge pressure airflow to an air plenum positioned an upstream end of the plurality of tubes, wherein the air plenum is positioned forward of the fuel plenum; and
    passing the compressor discharge pressure airflow from the air plenum over each of the plurality of tubes to a cap face of the cap member.

14. The method of claim 13, further comprising the step of providing the compressor discharge pressure airflow to the cap member.

15. The method of claim 14, further comprising the step of cooling a cap face of the cap member.

16. A pre-nozzle mixing cap assembly positioned about a cap member of a combustor for mixing a flow of air and a flow of fuel upstream of one or more fuel nozzles, comprising:
    a fuel plenum in communication with the flow of fuel;
    a plurality of tubes in communication with the flow of air and extending through the fuel plenum, wherein the fuel plenum is positioned about a downstream end of the plurality of tubes;
    each of the plurality of tubes comprising a plurality of fuel holes therein such that the flow of fuel in the fuel plenum passes through the plurality of fuel holes and mixes with the flow of air upstream of the one or more fuel nozzles; and
    an air plenum positioned adjacent to the fuel plenum with the plurality of tubes extending therethrough, wherein the air plenum is positioned at an upstream end of the plurality of tubes,
wherein the air plenum is positioned forward of the fuel plenum.

17. The pre-nozzle mixing cap assembly of claim 16, further comprising a plurality of plates with the plurality of tubes extending therethrough.

18. The pre-nozzle mixing cap assembly of claim 17, wherein the plurality of plates comprises a first plate and a second plate and wherein the first plate and the second plate define the fuel plenum therebetween.

19. The pre-nozzle mixing cap assembly of claim 18, wherein the plurality of plates comprises a third plate and wherein the second plate and the third plate define the air plenum therebetween.

20. The pre-nozzle mixing cap assembly of claim 16, wherein the air plenum is in communication with a compressor discharge pressure airflow via a plurality of flow sleeve holes.

* * * * *